(12) United States Patent
Abate (10) Patent No.: US 10,337,902 B2
(45) Date of Patent: Jul. 2, 2019

(54) GAS-DISPLACEMENT VOLUMETRY

(71) Applicant: Matthew C. L. Abate, Mountain Lakes, NJ (US)

(72) Inventor: Matthew C. L. Abate, Mountain Lakes, NJ (US)

(*) Notice: Subject to any disclaimer, the term of this patent is extended or adjusted under 35 U.S.C. 154(b) by 355 days.

(21) Appl. No.: 14/989,997

(22) Filed: Jan. 7, 2016

(65) Prior Publication Data

US 2017/0199068 A1 Jul. 13, 2017

(51) Int. Cl.
*G01F 17/00* (2006.01)

(52) U.S. Cl.
CPC .................. *G01F 17/00* (2013.01)

(58) Field of Classification Search
CPC .................................................. G01F 17/00
USPC ............................................................ 73/149
See application file for complete search history.

(56) References Cited

U.S. PATENT DOCUMENTS

| 4,095,473 | A | * | 6/1978 | Batchelor | G01N 9/02 526/59 |
| 4,144,763 | A | * | 3/1979 | Vogelman | A61B 5/0806 73/433 |
| 4,699,002 | A | * | 10/1987 | Rockley | E21B 49/005 73/152.07 |
| 4,888,718 | A | * | 12/1989 | Furuse | G01F 17/00 702/50 |
| 5,074,146 | A | * | 12/1991 | Orr | G01F 17/00 712/223 |
| 5,450,750 | A | * | 9/1995 | Abler | A61B 5/103 73/149 |
| 5,583,897 | A | * | 12/1996 | Hill | G01N 9/02 376/245 |
| 5,948,977 | A | * | 9/1999 | Siconolfi | G01F 22/02 73/149 |
| 6,004,103 | A | * | 12/1999 | Fisher | F04B 49/02 417/26 |
| 6,062,066 | A | * | 5/2000 | Loen | F02D 33/006 73/37 |
| 6,164,116 | A | * | 12/2000 | Rice | G01M 3/2876 73/1.72 |
| 7,257,985 | B2 | * | 8/2007 | Franda | B01F 3/1207 73/19.01 |
| 2015/0007646 | A1 | * | 1/2015 | Margalit | A61B 5/1073 73/149 |

* cited by examiner

*Primary Examiner* — Nathaniel T Woodward
(74) *Attorney, Agent, or Firm* — Mark J. Abate (57) ABSTRACT

A system and method of gas-displacement volumetry uses a pressure differential between two chambers of known volumes in order to calculate the volume of an object placed inside one of the chambers. The process involves measuring the pressures of a gas within two sealed chambers with one of the chambers containing an object, equalizing the pressure in the two chambers and using the equilibrium pressure, as well as the two initial pressures, to form a ratio between the free volumes of these chambers. From the pressure differentials and ratios of free volumes, the volume of the object can be determined. The system and method can be automated and controlled through the use of computers, sensors and controls. The system and method can be used to accurately determine the volume of irregular objects.

13 Claims, 6 Drawing Sheets

Figure 1: Prior art liquid-displacement system and method

Figure 2: Gas-displacement system and method

Figure 3: Application of gas-displacement system and method to determine the volume of an object

GAS-DISPLACEMENT VOLUMETRY

TECHNICAL FIELD

A system and method for determining the volume of objects and more specifically for using gas displacement for determining the volume of objects.

BACKGROUND

Volume of an object is the amount of three-dimensional space occupied by the object. Archimedes theorized the method of liquid-displacement for determining the volume of irregular objects. Liquid-displacement volumetry involves observing the height differential of the surface of a contained liquid before and after submerging an object in the liquid. The volume of the object can be calculated as the height differential multiplied by the average surface area of the contained liquid. Liquid-displacement volumetry is still widely used.

Figure 1:
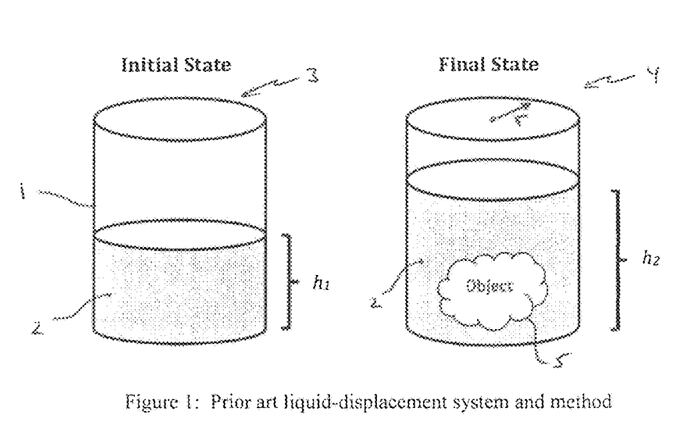
FIG. 1 illustrates a prior art liquid-displacement system.

FIG. 1 displays a typical prior art liquid-displacement volumetry system. A cylindrical container 1 contains a liquid 2. In an initial state 3, only liquid 2 is contained within container 1 and $h_1$ is the height of liquid 2 in the container 1. Once an object 5 is submerged in liquid 2, the height of liquid 2 in container 1 rises to level $h_2$ in a final state 4. Thus, submerging object 5 in liquid 2 causes the height of liquid 2 in container 1 to rise from $h_1$ to $h_2$. In addition, because the container in FIG. 1 is a cylinder, the surface area of the liquid is $\pi r^2$, where the cylinder has a radius r. The volume of the object 5 can be obtained by multiplying the height differential of the liquid between the final state 4 and the initial state 3, by the surface area of the displaced liquid, $(h_2-h_1)\pi r^2$.

The accuracy of a liquid-displacement system depends on, among other things, the atomic radius of the molecules in the liquid. Liquids with smaller average molecular radii are more likely to fully compress against the surface of an object and therefore provide a more accurate estimate of the object's volume than liquids with larger average molecular radii. Water is the preferred liquid to use in a liquid-displacement system because water has one of the lowest molecular radii of any chemical compound. Chaplin, Martin, "Water Molecule Structure," *Water Structure and Science* (London South Bank University, n.d. Web. 1 Sep. 2015). Water is also readily abundant and is a liquid at room temperature.

SUMMARY

The conditions under which liquid-displacement volumetry is appropriate are actually quite constrained. First, accurate measurement of volume by liquid-displacement requires the object have a density greater than the liquid used in the liquid displacement system. That is, the object cannot float to the surface of the liquid. The object, when placed in the liquid, must submerge fully and displace the liquid. Moreover, the object cannot be fragile. A liquid exerts a force on a submerged object such that a fragile object may be deformed or crushed. In addition, the object cannot be soluble in liquid. A soluble object will dissolve in the liquid preventing accurate volume measurement. Also, the instruments used in a liquid-displacement system must correspond to the size of the object: a small graduated cylinder cannot be used to measure the volume of a large object, and similarly a very large graduated cylinder cannot be used to accurately measure the volume of a small object. Finally, repeat measurements of the volume of an object in a liquid displacement system require waiting for liquid on the surface of the object from the first measurement to fully evaporate before repeating the process. This problem affects porous objects in particular, as the rate of evaporation from cavities in porous objects is often much slower than the rate of evaporation on the outermost surfaces of objects.

The system and method of gas-displacement volumetry involves two chambers connected by pipes and valves and a source of pressurized gas. The volumes of the chambers, if not previously known, can be calculated using the system and method as part of a calibration step. A pressure differential between the chambers is used to calculate the volume of an object placed inside one of the chambers. The process involves placing an object in one of the chambers, measuring the pressures of the gases within the chambers with the object in the one chamber, equalizing the pressure in the chambers and using the equilibrium pressure, as well as the volumes of the chambers and the two initial pressures, to form a ratio between the free volumes of these chambers. From the volumes of the chambers, the initial pressures, the final pressure and ratios of free volumes, the volume of the object can be determined. The system and method can be automated and controlled through the use of computers, sensors and controls.

DESCRIPTION OF PREFERRED EMBODIMENTS

Figure 2:
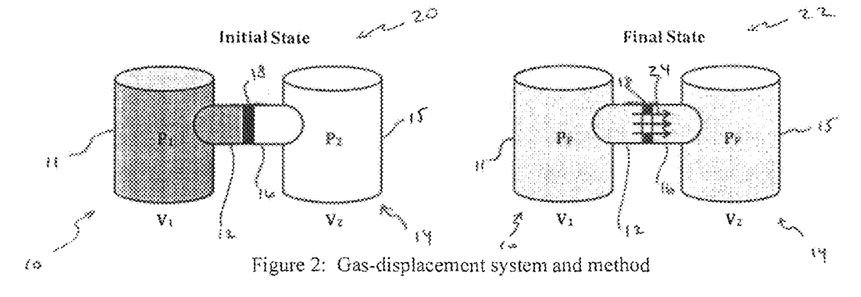
FIG. 2 illustrates a gas-displacement system and the method of gas-displacement volumetry.

FIG. 2 shows a gas-displacement system and process of gas-displacement volumetry. As shown in FIG. 2, Chamber 10 has a cylindrical portion 11 connected to a tubular portion 12. Chamber 10 has an interior volume $V_1$ and contains a gas at pressure $P_1$. Chamber 14 has a cylindrical portion 15 connected to a tubular portion 16. Chamber 14 has an interior volume and contains a gas at pressure $P_2$. In the preferred embodiment, the same gas is contained in chambers 10 and 14. However, a person skilled in the art would understand that different gases can be used in chambers 10 and 14. Tubular portions 12 and 16 of chambers 10 and 14 are connected to a pressure valve 18.

Pressure valve 18 can be closed such that the interior volumes $V_1$ and $V_2$ of chambers 10 and 14 are isolated from one another. Pressure valve 18 also can be opened such that the interior volumes $V_1$ and $V_2$ of chambers 10 and 14 are connected to one another. When pressure valve 18 is open, gas can flow between chambers 10 and 14 and the pressures $P_1$ and $P_2$ in chambers 10 and 14 will equalize.

FIG. 2 shows the gas-displacement system in both an initial state 20 and a final state 22. In the initial state 20, pressure valve 18 is closed such that the interior volumes $V_1$ and $V_2$ of chambers 10 and 14 are isolated. Because the chambers 10 and 14 are isolated, the gases contained in those chambers can be maintained at different pressures. As shown in FIG. 2, in the initial state 20, the gas contained in chamber 10 is at pressure $P_1$ and the gas contained in chamber 14 is at pressure $P_2$. In this example, pressure $P_1$ in chamber 10 is greater than pressure $P_2$ in chamber 14 when the gas-displacement system is in the initial state.

If the pressure valve 18 is opened, the gas-displacement system assumes the final state 22, shown in FIG. 2. In the final state 22, pressure valve 18 is open such that the interior volumes $V_1$ and $V_2$ of chambers 10 and 14 are connected. Because the initial state pressure $P_1$ was greater than pressure $P_2$ when valve 18 was opened, gas flows from chamber 10 to chamber 14, as shown at 24, equalizing the pressures in the two chambers in the final state. Because the chambers 10 and 14 are connected, the gases contained in those chambers assume the same pressure. In the final state 22, the gas in chamber 10 and the gas in chamber 14 are at pressure $P_F$.

While the chambers 10 and 14 in FIG. 2 are shown having cylindrical portions 11 and 15 and tubular portions 12 and 16 connected through a valve 18, it would be appreciated by persons of ordinary skill in the art that chambers of various geometries can be used in the system and method for gas-displacement volumetry. Indeed, FIG. 5, as described below, shows a chamber having a flattened spherical geometry. Chambers of known volume in any geometry can be used in the system and method.

According to Boyle's Law, pressure and volume of an ideal gas are related. Specifically, Boyle's Law provides that for a fixed amount of an ideal gas kept at a constant temperature, pressure and volume are inversely proportional or $$P \propto \frac{1}{V}.$$

Alternatively, Boyle's Law can be expressed as the product of pressure and volume, which is a constant for a given mass of confined gas at a constant temperature, or PV=k where k is a constant. If comparing a gas at a constant temperature (or gases at constant temperatures) under two different sets of pressure/volume conditions, Boyle's Law can be expressed as $P_1V_1=P_2V_2$.

Applying Boyle's Law to the gas-displacement volumetry system and method of FIG. 2, the relationship between volumes $V_1+V_2$ of chambers 10 and 14 and the pressures $P_1$, $P_2$ and $P_F$ of the gases contained therein can be expressed as $P_1V_1+P_2V_2=P_F(V_1+V_2)$. Equation 1 below is a derivation of Boyle's Law relating the volumes of the chambers 10 and 14 in FIG. 2 to the measured pressures $P_1$, $P_2$ and $P_F$:

$$\boxed{\frac{V_2}{V_1} = \frac{P_1 - P_F}{P_F - P_2}}$$

Figure 3:
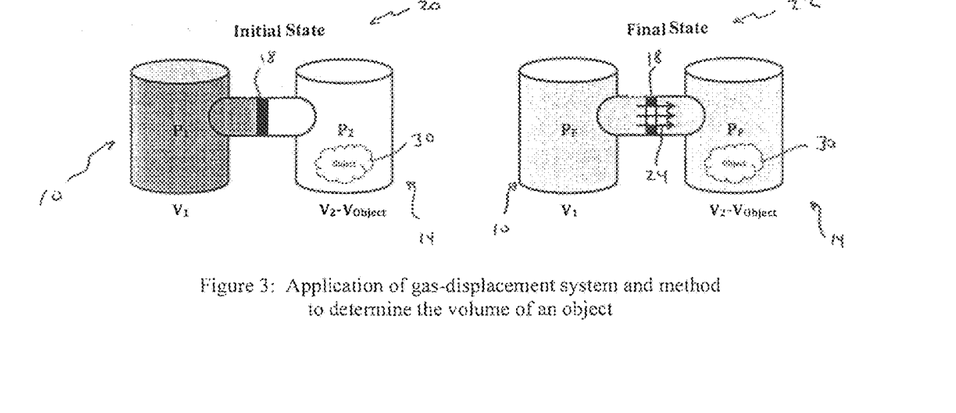
FIG. 3 illustrates application of the gas-displacement system and method of gas-displacement volumetry to determine the volume of an object.

Equation 1: Relationship of the ratio of the volumes of the chambers in FIG. 2 to the measured pressures in the gas-displacement system and method FIG. 3 shows how the gas-displacement system and method can be used to determine the volume of an object. As shown in FIG. 3, in initial state 20, chamber 10 of volume $V_1$, contains a gas at pressure $P_1$. Chamber 14 of volume $V_2$ contains a gas a pressure $P_2$ and an object 30 of volume $V_{object}$. Because the object displaces some volume in chamber 14, the volume of gas contained in chamber 14 (i.e. free volume) is $V_2-V_{object}$. In initial state 20, the chambers 10 and 14 are isolated by closed valve 18.

In this example, pressure $P_1$ is greater than pressure $P_2$ in the initial state 20. When the valve 18 is opened, gas flows from chamber 10 to chamber 14, as shown at 24, equalizing the pressures in the two chambers 10 and 14 and the system assumes the final state 22. The pressure in chambers 10 and 14 in the final state is pressure $P_F$. Again, applying Boyle's Law, Equation 2 relates the unknown volume of that object to the known values $V_1$, $V_2$, $P_1$, $P_2$, and $P_F$.

$$\boxed{V_{Object} = V_2 - V_1 \frac{P_1 - P_F}{P_F - P_2}}$$

Equation 2: Relationship of the volume of an object in FIG. 3 and as a function of the volumes of the chambers and the measured pressures in the gas-displacement system and method In its simplest form, the gas-displacement volumetry system and the gas contained in chambers 10 and 14 are maintained at a constant temperature. Further, the system can accommodate a negligible temperature change in the gas as the gas expands from the first chamber 10 into the second chamber 14. If there is a temperature differential between the initial and final states, Boyle's Law cannot be used. Rather the relationship between the pressures, volumes and temperatures would need to be derived from the Ideal Gas Law. As would be apparent to a person of ordinary skill in the art, the system and method of gas-displacement volumetry described herein could be used with a system incorporating a temperature differential between the initial and final states through application of the Ideal Gas Law. That is, in a situation where the temperature of the gas in the final state differs from the temperature of the initial state, a formula to determine $V_{object}$ can be derived from the Ideal Gas Law for use in the system and method described herein.

As is apparent from the system and method disclosed herein, gas-displacement volumetry offers a much broader range of applications than water-displacement volumetry. For example, gas-displacement can be used to measure the volume of an object of any density, including objects with an average density less than that of the gas within the chamber. The chamber is sealed and therefore will maintain the object within the chamber, within the gas. Gas-displacement volumetry can be used to measure the volumes of objects which are fragile or water soluble, and can even measure the volumes of liquids. As no liquid coating will be left on the object after measurement, the gas-displacement process can be repeated without any delay, which would allow a more precise determination of the volume of an object through a statistical analysis of multiple measurements.

The preferred gas for use in the system and method described herein is air. While portions of this description focus on embodiments using air, it would be apparent to a person of ordinary skill in the art that any gas subject to Boyle's Law or the Ideal Gas Law could be used in the system and method of gas-displacement volumetry.

Figure 4:
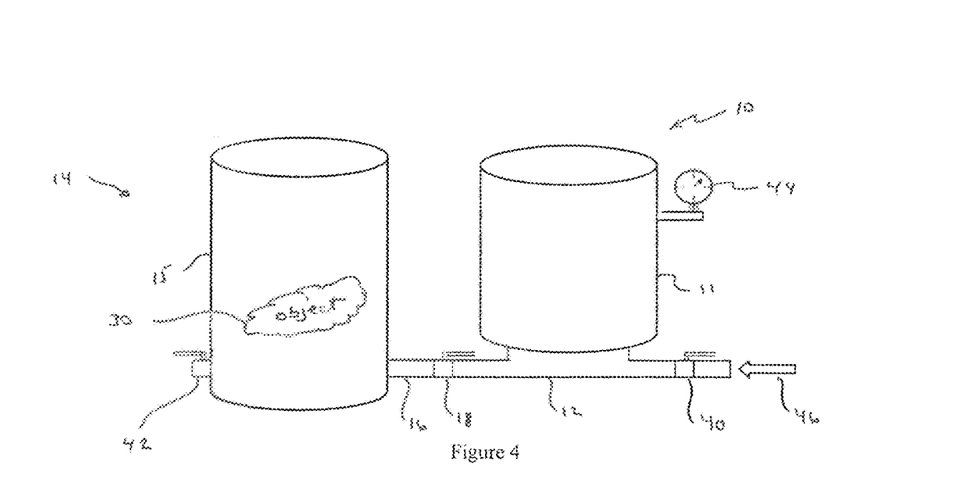
FIG. 4 illustrates a first embodiment of a gas-displacement volumetry system.

FIG. 4 shows an embodiment of an air-displacement volumetry system. The system is composed of two cylindrical chambers 10 and 14, connected by pipes 12 and 16, with a valve 18 between them. There are also two additional valves on the device, one valve 40 to control the flow of pressurized air into the chamber 10 and a second valve 42 to relieve the pressure in the chamber 14 following measurement. A pressure gauge 44 monitors the pressure difference between the chamber 10 and ambient conditions. A source of pressurized air, such as a compressor, is attached to one end of valve 40, as signified by the arrow 46.

The FIG. 4 embodiment of the gas-displacement volumetry system and method can be used to determine the volume of an irregularly shaped object. First, volume $V_1$ of chamber 10 and Volume $V_2$ of chamber 14 are determined and recorded. The volumes of the chambers can be determined in a variety of ways. As described below, the gas-displacement system and method can be used as part of a calibration process to determine the volume of the chambers. Water displacement can also be used to determine the volume of the chambers. An object 30 is placed within chamber 14. Then valve 42 is opened so that pressure $P_2$ in chamber 14 is the ambient air pressure. Then both valve 42 and valve 18 are closed, isolating chamber 14 from external gas or pressure so that pressure $P_2$ in chamber 15 is maintained at ambient air pressure. Then valve 40 is opened and pressurized air is provided through valve 40 to chamber 10 as signified by arrow 46. As a result of the pressurized air delivered to chamber 10, chamber 10 attains a pressure of $P_1$. Valve 40 is closed to maintain pressure $P_1$ in chamber 10. Then the temperature of both chambers and the gas inside the chambers are recorded and pressure $P_1$ of chamber 10, as indicated by pressure gauge 44, is also recorded. Then valve 18 is opened. Once valve 18 is opened and because pressure $P_1$ in chamber 10 is greater than pressure $P_2$ in chamber 14, gas flows from chamber 10 through valve 18 and into chamber 14. The pressure in chambers 10 and 14 equalize as pressure $P_F$, which is read from gauge 44 and recorded. Finally, the temperatures of the chambers 10 and 14 and the gases therein is recorded. Presuming that the initial and final temperatures of the chambers and gases are the same, the pressure and volume values $P_1$, $P_2$, $P_F$, $V_1$ and $V_2$ are used in equation 2 above to determine the volume of the object, $V_{object}$. Again, if a temperature difference is recorded in the initial and final states, the temperature of the gas at the initial state, $T_1$, and the temperature of the gas at the final state, $T_2$, could be used with the pressure and volume values $P_1$, $P_2$, $P_F$, $V_1$ and $V_2$ and the Ideal Gas Law to calculate volume of the object, $V_{object}$.

Figure 5:
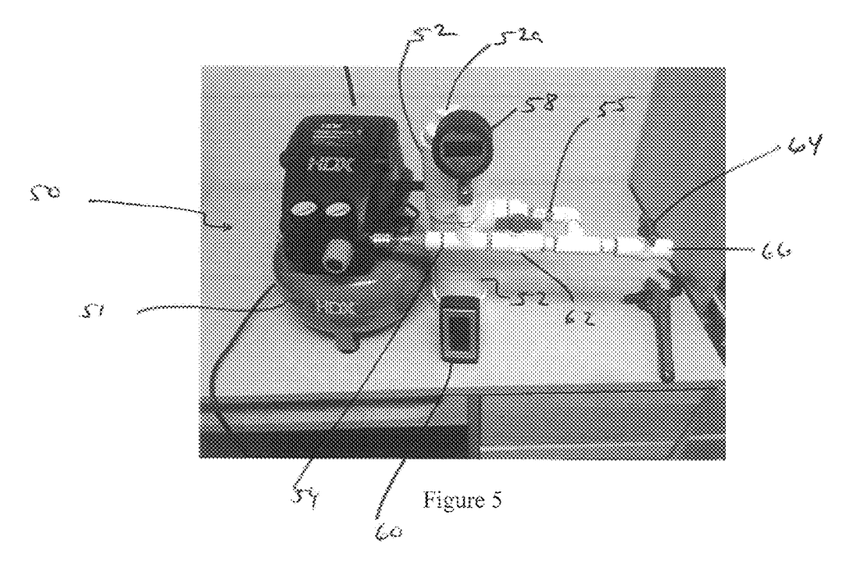
FIG. 5 illustrates a second embodiment of a gas-displacement volumetry system.

FIG. 5 shows another embodiment of the air-displacement system. Unlike the embodiment of FIG. 4, in which there are two chambers and an external source of air pressure, in the FIG. 5 embodiment, an air compressor 50 holding tank 51 of a known volume is used as one of the chambers. The air compressor 50 holding tank 51 is connected by PVC piping 54 and 55 to PVC chamber 52. PVC chamber 52 is made of PVC piping approximately 4 inches in diameter and 12 inches long (PVC chamber 52 is partially obscured by pressure gauge 58). Chamber 52 has a removable threaded plug 52a at its upper end. Removable threaded plug 52a can be removed to allow insertion of an object into chamber 52 and then reattached to seal the object within chamber 52.

In the preferred embodiment, an HDX™ Pancake air compressor was used, which is specified as having a holding tank with a volume of two gallons, see http://www.homedepot.com/p/HDX-2-Gal-Pancake-Air-Compressor-0210284C/205467817.

However, a better estimate of the volume of the holding tank 51 of air compressor 50 was determined during a preliminary calibration processes as described below. A Dwyer™ DGPA-8 pressure gauge 58 is also used in the system and method. That pressure gauge is specified to provide a measurement range from 0-100 PSI with an accuracy in its measurements to ±0.1 PSI. See "Series DPGA & DPGW Digital Pressure Gage with 1% Accuracy," *Dwyer Instruments*, Dwyer Instruments, Inc., n.d. Web. An AcuRite® 0.00826HD wireless air temperature monitor 60, which claims accuracy in its measurements to ±0.5 Fahrenheit with a screen data refresh every 30 seconds, is also provided. See "Digital Thermometer with Indoor/Outdoor Temperature,"*AcuRite Digital Indoor/Outdoor Thermometer with Clock*, AcuRite, n.d. Web. 1 Sep. 2015. A wireless probe (not pictured) of the temperature monitor 60 was placed in the PVC chamber. Testing was conducted to determine the average temperature differential arising from equalizing the air pressures of the two chambers, however, no such temperature differential was detected.

Valve 62 is connected to piping 54 and 55 in between the air compressor 50 holding tank 51 and PVC chamber 52. A second valve 64 is connected between piping 55 and an external outlet 56 to ambient conditions.

The FIG. 5 embodiment of the gas-displacement volumetry system and method can be used to determine the volume of an irregularly shaped object. First, volume $V_1$ of holding tank 51 and Volume $V_2$ of chamber 52 are determined and recorded. Removable threaded plug 52a is removed from chamber 52. An object is placed within chamber 52. Removable threaded plug 52a is reattached to chamber 52, sealing the object within chamber 52. Valve 62 is closed so that air compressor 50 holding tank 51 is isolated from the rest of the system. Then valve 64 is opened connecting chamber 52 through pipe 55 and outlet 56 to ambient conditions so that pressure $P_2$ in chamber 52 is the ambient air pressure. Then valve 64 is closed, isolating chamber 52 from external gas or pressure so that pressure $P_2$ chamber 52 is maintained at ambient air pressure. The air compressor 50 is turned on providing pressurized air to holding tank 51. As a result of the pressurized air delivered to the holding tank 51, tank 51 attains a pressure of $P_1$. Then the temperature of both chambers is recorded and pressure $P_1$ of holding tank 51, as indicated by gauge 58, is also recorded. Then valve 62 is opened. Once valve 62 is opened, because the pressure $P_1$ in holding tank 51 is greater than pressure $P_2$ in chamber 52, gas flows from holding tank 51 through valve 62 to chamber 52. The pressure in the holding tank 51 and chamber 52 equalize as pressure $P_F$, which is read from gauge 58 and recorded. Finally, the temperature of the holding tank 51 and chamber 52 and of the gases therein is recorded. Presuming that the initial and final state temperatures of the systems and gases are the same, the pressure and volume values $P_1$, $P_2$, $P_F$, $V_1$ and $V_2$ are used in equation 2 above to determine the volume of the object, $V_{object}$. Again, if a temperature difference is recorded in the initial and final states, the temperature at the initial state, $T_1$, and the temperature at the final state, $T_2$, could be used with the pressure and volume values $P_1$, $P_2$, $P_F$, $V_1$ and $V_2$ and the Ideal Gas Law to calculate volume of the object, $V_{object}$.

PVC plastic was chosen as the desired material for chamber 52 due to its hard, rigid nature and low cost. Rigid PVC can have a tensile strength of up to 62 MPa, which makes it one of the most rigid plastics in common use. PVC is also abundant in industry, notably because of its affordability. The entirety of the PVC used in construction of the final prototype only cost $25. Together with the cost of the Dwyer Gauge and the HDX compressor, the final construction cost of the air-displacement machine came to approximately $175.

Further, the system and method of gas-displacement volumetry can be used with objects of known volume to determine the volumes of the chambers in a given system. In this manner, the volumes of the chambers in a gas-displacement system can be calibrated before measuring volumes of objects of unknown volume. For example, if, in FIG. 3 or 4, the volume $V_1$ of chamber 10 and the volume $V_{object}$ of object 30 are known along with pressures $P_1$, $P_2$ and $P_F$, then the volume $V_2$ of chamber 14 can be calculated using equation 3 below, which was derived by solving equation 2 above for $V_2$.

$$V_2 = V_{object} + V_1 \left( \frac{P_1 - P_F}{P_F - P_2} \right)$$

Equation 3: Relationship of the volume of a chamber as a function of the volume of the other chamber and the volume of the object and the measured pressures Likewise, if, in FIG. 3 or 4, the volume $V_2$ of chamber 14 and the volume $V_{object}$ of object 30 are known along with pressures $P_1$, $P_2$ and $P_F$, then the volume $V_1$ of chamber 10 can be calculated using equation 4 below, which was derived by solving equation 2 above for $V_1$.

$$V_1 = (V_2 - V_{object}) \left( \frac{P_F - P_2}{P_1 - P_F} \right)$$

Equation 4: Relationship of the volume of a chamber as a function of the volume of the other chamber and the volume of the object and the measured pressures Finally, if, in FIG. 3 or 4, the volume $V_1$ of chamber 10 and the volume $V_2$ of chamber 14 are both unknown, the volumes of those chambers can be determined by multiple tests with multiple objects of known volumes. That is, if the volume $V_{object}$ of a first object is known along with pressures $P_1$, $P_2$ and $P_F$ in a first test and if the volume $V_{object}$ of a second object is known along with pressures $P_1$, $P_2$ and $P_F$ in a second test, then the volume $V_1$ of chamber 10 and volume $V_2$ of chamber 14 can be calculated by using the volumes of the first and second objects along with the pressures $P_1$, $P_2$ and $P_F$ of the first and second tests and solving for $V_1$ and $V_2$ in the equations above. Again, the discussion immediately above is for systems at constant temperature. If the temperature changes as the system goes from the initial state having pressures $P_1$ and $P_2$ to the final state having pressure $P_F$, then the Ideal Gas Law can be used to derive equations to allow calibration of the volumes $V_1$ and $V_2$ of the chambers 10 and 14.

Test were undertaken to determine the volumes of the air compressor 50 holding tank 51 and PVC chamber 52 in the FIG. 5 embodiment. Objects of known volume were placed inside the PVC chamber 52 and through air-displacement, the ratio of the free volumes of the holding tank 51 and chamber 52 were determined. Equations 5a-d below were used to determine the free volumes of the chambers.

$$\boxed{\frac{V_2}{V_1} = R_1}$$

Equation 5a: Ratio of the volumes of empty chambers $$\boxed{\frac{V_2 - V_{Object}}{V_1} = R_2}$$

Equation 5b: Ratio of the free volumes of the chambers with one chamber containing an object of known volume $$\boxed{V_1 = V_{Object} \frac{1}{R_1 - R_2}} \quad \boxed{V_2 = V_{Object} \frac{R_1}{R_1 - R_2}}$$

Equations 5c (Left) and 5d (Right): Relation between the free volumes of the empty chambers and the ratios calculated during calibration The above formulas are derived from Boyle's Law for a system at a constant temperature. As described above, in an environment where there is a temperature difference between the initial and final states, equations for volume calibration in conjunction with the gas-displacement system and method can be derived from the Ideal Gas Law, as would be understood by a person skilled in the art.

Data from calibration testing is reproduced in Table 1 below. The first two rows in Table 1, following the headers, show the volume ratios of the chambers calculated after running the air-displacement system with no object in the PVC canister (the test was repeated to ensure accuracy). The final $R_1$ value, as defined in Equation 5a, was determined by taking the average of the average volumetric ratios from these first two tests and was found to be 0.242. Because this is expressed as a ratio of volumes, there are no associated units.

The remaining ten rows of Table 1 each detail the calibration of the air-displacement system with a different object (as identified in column 1) of known volume.

TABLE 1

Calibration test data

| 1 Object Name | 2 Initial Water Volume (mL) | 3 Final Water Volume (mL) | 4 Volume of Object (mL) | 5 Run | 6 Raised Pressure $P_1$ in $V_1$ (PSI) | 7 Equalized Pressure $P_F$ (PSI) | 8 Calculated Volume Ratio ($V_2 - V_{object}$)/$V_1$ | 9 Average Ratio ($V_2 - V_{object}$)/$V_1$ | 10 Predicted PVC Canister Volume (mL) | 11 Predicted Compressor Volume (mL) |
|---|---|---|---|---|---|---|---|---|---|---|
| Empty | 0 | 0 | 0 | 1 | 15.8 | 12.8 | 0.234 | 0.239 | | |
| | | | | 2 | 12.8 | 10.3 | 0.243 | | | |
| | | | | 3 | 10.3 | 8.3 | 0.241 | | | |

TABLE 1-continued

Calibration test data

| 1 Object Name | 2 Initial Water Volume (mL) | 3 Final Water Volume (mL) | 4 Volume of Object (mL) | 5 Run | 6 Raised Pressure $P_1$ in $V_1$ (PSI) | 7 Equalized Pressure $P_F$ (PSI) | 8 Calculated Volume Ratio $(V_2 - V_{object})/V_1$ | 9 Average Ratio $(V_2 - V_{object})/V_1$ | 10 Predicted PVC Canister Volume (mL) | 11 Predicted Compressor Volume (mL) |
|---|---|---|---|---|---|---|---|---|---|---|
| Empty | 0 | 0 | 0 | 1 | 17.05 | 13.7 | 0.245 | 0.244 | | |
| | | | | 2 | 13.7 | 11 | 0.245 | | | |
| | | | | 3 | 11 | 8.85 | 0.243 | | | |
| 8 fl oz PVC Cement Can | 705 | 998 | 293 | 1 | 17.9 | 14.8 | 0.209 | 0.206 | 1990 | 8240 |
| | | | | 2 | 14.8 | 12.3 | 0.203 | | | |
| | | | | 3 | 12.3 | 10.2 | 0.206 | | | |
| CVS Antifungal Liquid Bottle | 26 | 78 | 52 | 1 | 15.1 | 12.2 | 0.238 | 0.236 | 2280 | 9440 |
| | | | | 2 | 12.2 | 9.85 | 0.239 | | | |
| | | | | 3 | 9.85 | 8 | 0.231 | | | |
| Solder Block | 170 | 224 | 54 | 1 | 17.45 | 14.1 | 0.238 | 0.236 | 2370 | 9810 |
| | | | | 2 | 14.1 | 11.4 | 0.237 | | | |
| | | | | 3 | 11.4 | 9.25 | 0.232 | | | |
| PVC Bits | 800 | 910 | 110 | 1 | 15.3 | 12.4 | 0.234 | 0.229 | 2130 | 8820 |
| | | | | 2 | 12.4 | 10.05 | 0.234 | | | |
| | | | | 3 | 10.05 | 8.25 | 0.218 | | | |
| Super Sharpie | 400 | 460 | 60 | 1 | 17.7 | 14.35 | 0.233 | 0.235 | 2230 | 9230 |
| | | | | 2 | 14.35 | 11.6 | 0.237 | | | |
| | | | | 3 | 11.6 | 9.4 | 0.234 | | | |
| 340 g Gulden's Mustard bottle | 455 | 840 | 385 | 1 | 14.1 | 11.8 | 0.195 | 0.193 | 1920 | 7950 |
| | | | | 2 | 11.8 | 9.9 | 0.192 | | | |
| | | | | 3 | 9.9 | 8.3 | 0.193 | | | |
| Stewart's Rootbeer Bottle | 100 | 570 | 470 | 1 | 15.05 | 12.7 | 0.185 | 0.182 | 1910 | 7910 |
| | | | | 2 | 12.7 | 10.75 | 0.181 | | | |
| | | | | 3 | 10.75 | 9.1 | 0.181 | | | |
| 16.9 fl oz Vitamin Water Bottle | 450 | 970 | 520 | 1 | 14.85 | 12.7 | 0.169 | 0.177 | 1950 | 8070 |
| | | | | 2 | 12.7 | 10.8 | 0.176 | | | |
| | | | | 3 | 10.8 | 9.1 | 0.187 | | | |
| 12 fl oz Coke Can | 300 | 695 | 395 | 1 | 23.95 | 20 | 0.198 | 0.192 | 1930 | 7990 |
| | | | | 2 | 20 | 16.85 | 0.187 | | | |
| | | | | 3 | 16.85 | 14.15 | 0.191 | | | |
| Two 12 fl oz Coke Cans | — | — | 790 | 1 | 17.55 | 15.3 | 0.147 | 0.145 | 1980 | 8200 |
| | | | | 2 | 15.3 | 13.4 | 0.142 | | | |
| | | | | 3 | 13.4 | 11.7 | 0.145 | | | |
| | | | | | | | | Average volumes (mL) | 2070 | 8570 |

The first three columns (columns 2-4) on the left of the table, after the "Object Name" in column 1, refer to initial water-displacement volumetry tests of the objects. Those columns correspond to the initial water volume in a graduated cylinder, the final water volume after submerging the object, and the calculated volume of the object, each measured in milliliters. The next three columns (columns 5-7) show data from air-displacement tests. Those columns show run numbers (the air-displacement volumetry test was run three times for each object), raised pressure $P_1$ in holding tank 51 of volume $V_1$ and equalized pressure $V_F$ in the holding tank 51 and chamber 52. The PVC chamber 52 was initially equalized to the ambient pressure ($P_2$=ambient) and, as gauge 58 measures the pressure differential between the contained pressure and the ambient pressure, the PVC canister had an initial internal pressure $P_2$ of 0 PSI. The next two columns (columns 8 and 9) represent the free volume ratio $R_2$ of the chambers. Column 8 shows volume ratio calculated for each of the three runs and column 9 shows the average volume ratio for the three runs. The values in rows 1 and 2 of columns 8 and 9 correspond to $R_1$ in Equation 5a, i.e. when the chambers are empty. The values in the remaining rows of columns 8 and 9 correspond to $R_2$ in Equation 5b, i.e. when an object is placed within PVC chamber 52. Using equations 5c and 5d, the free volumes of the PVC chamber 52 and air compressor 50 holding tank 51 were determined using the $R_1$ and $R_2$ values in columns 8 and 9. Columns 10 and 11 show the calculated volumes of the PVC chamber 52 and the air compressor 50 holding tank 51. The average calculated volume of the PVC chamber 52 was 2070 mL and the average calculated volume of the air compressor 50 holding tank 51 was 8570 mL, as shown at the bottom of the table.

Once the calibration process was complete such that the volumes of the air compressor 50 holding tank 51 and PVC chambers 52 were known, the gas-displacement system and method was used to determine the volumes of various objects. For comparison purposes, the volumes of these objects were also measured using a water-displacement (each object was regular, non-porous, rigid and insoluble). To ensure consistency in measurement conditions, the initial pressure differentials between the chambers were kept within a similar range to that of the calibration tests.

The measurements of volumes for three objects using the gas-displacement system of FIG. 5 are shown in Table 2 below.

TABLE 2

Air-displacement test data

| 1 Object Name | 2 Initial Water Volume (mL) | 3 Final Water Volume (mL) | 4 Volume of Object (mL) | 5 Run | 6 Raised Pressure $P_1$ in $V_1$ (PSI) | 7 Equalized Pressure $P_F$ (PSI) | 8 Predicted volume of object (mL) |
|---|---|---|---|---|---|---|---|
| Stewart's Rootbeer Bottle | 100 | 570 | 470 | 1 | 15.25 | 12.8 | 474 |
|  |  |  |  | 2 | 12.8 | 10.85 |  |
|  |  |  |  | 3 | 10.85 | 9.2 |  |
| Goya Coconut Juice Can | 440 | 680 | 240 | 1 | 14.05 | 11.5 | 242 |
|  |  |  |  | 2 | 11.5 | 9.5 |  |
|  |  |  |  | 3 | 9.5 | 7.9 |  |
| Pliars | 135 | 170 | 35 | 1 | 11.95 | 9.6 | 34.4 |
|  |  |  |  | 2 | 9.6 | 7.75 |  |
|  |  |  |  | 3 | 7.75 | 6.3 |  |

In Table 2, column 1 identifies each object and columns 2-4 show calculation of the volume of each object using water displacement for comparison purposes. Columns 5-7 show data from the air-displacement tests, i.e. corresponding run number, raised pressure $P_1$ in holding tank 51 of Volume $V_1$ and equalized pressure $V_F$ in the holding tank 51 and chamber 52. The PVC chamber 52 was initially equalized to the ambient pressure ($P_2$=ambient) and, as gauge 58 measures the pressure differential between the contained pressure and the ambient pressure, the PVC canister had an initial internal pressure $P_2$ of 0 PSI. Column 8 shows the volume of the object, $V_{object}$, calculated using equation 2 with valves $P_1$, $P_2$, $P_F$, $V_1$ and $V_2$. For all three objects, the gas-displacement system and method measured the volume of the objects within 2% of the volume calculated by water-displacement, which confirms the accuracy of air-displacement volumetry.

Figure 6:
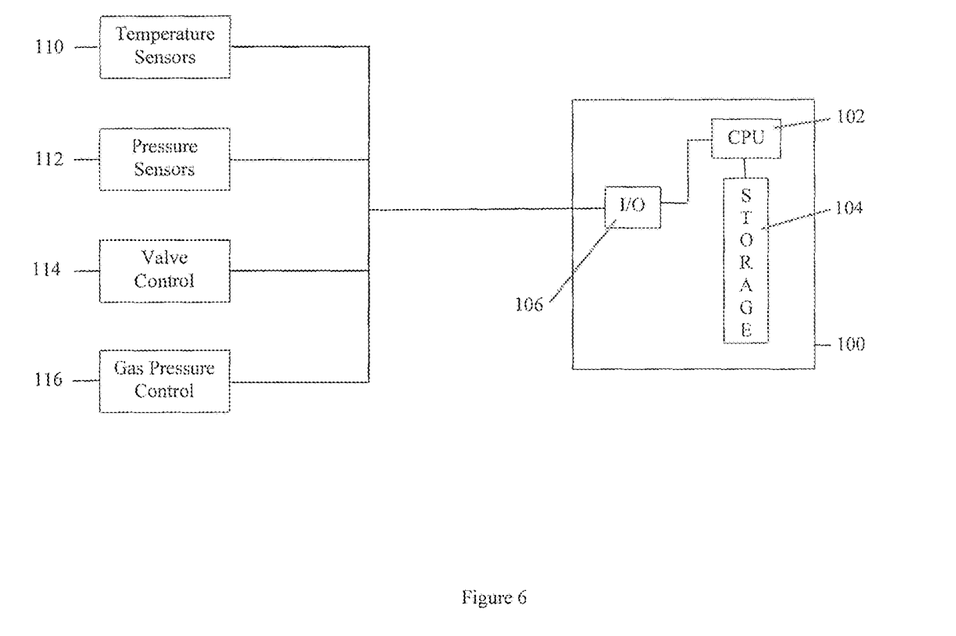
FIG. 6 illustrates a computerized implementation of the gas-displacement volumetry system.

The gas-displacement volumetry system and method can be controlled by a general purpose computer operating software. A representative hardware diagram for a computer implemented gas-displacement volumetry system and method is shown in FIG. 6. A representative flowchart for operation of a computer implemented gas-displacement volumetry system and method is shown in FIG. 7.

As shown in FIG. 6, the system and method of gas-displacement volumetry can be automated and controlled by a general purpose computer 100. General purpose computer 100 includes a CPU 102, storage 104 and an input/output device 106. Input output device connects the computer 100 to temperature sensors 110, pressure sensors 112, valve control mechanisms 114 and a gas pressure control mechanism 116, which are existing general purpose hardware components available to persons skilled in the art. The sensors 110, 112 and controls 114, 116 are connected to and operate in conjunction with the components described above in relation to FIGS. 2-5. The computer 100 receives data from temperature and pressure sensors 110, 112 at least during the initial and final states as described above. The computer 100 controls valve control mechanisms 114 to open and close the valves for introducing, maintaining and equalizing the pressures in the chambers 114 as described above. The computer 100 also controls the source of pressurized gas 116 to introduce pressurized gas into the system as described above.

Figure 7:
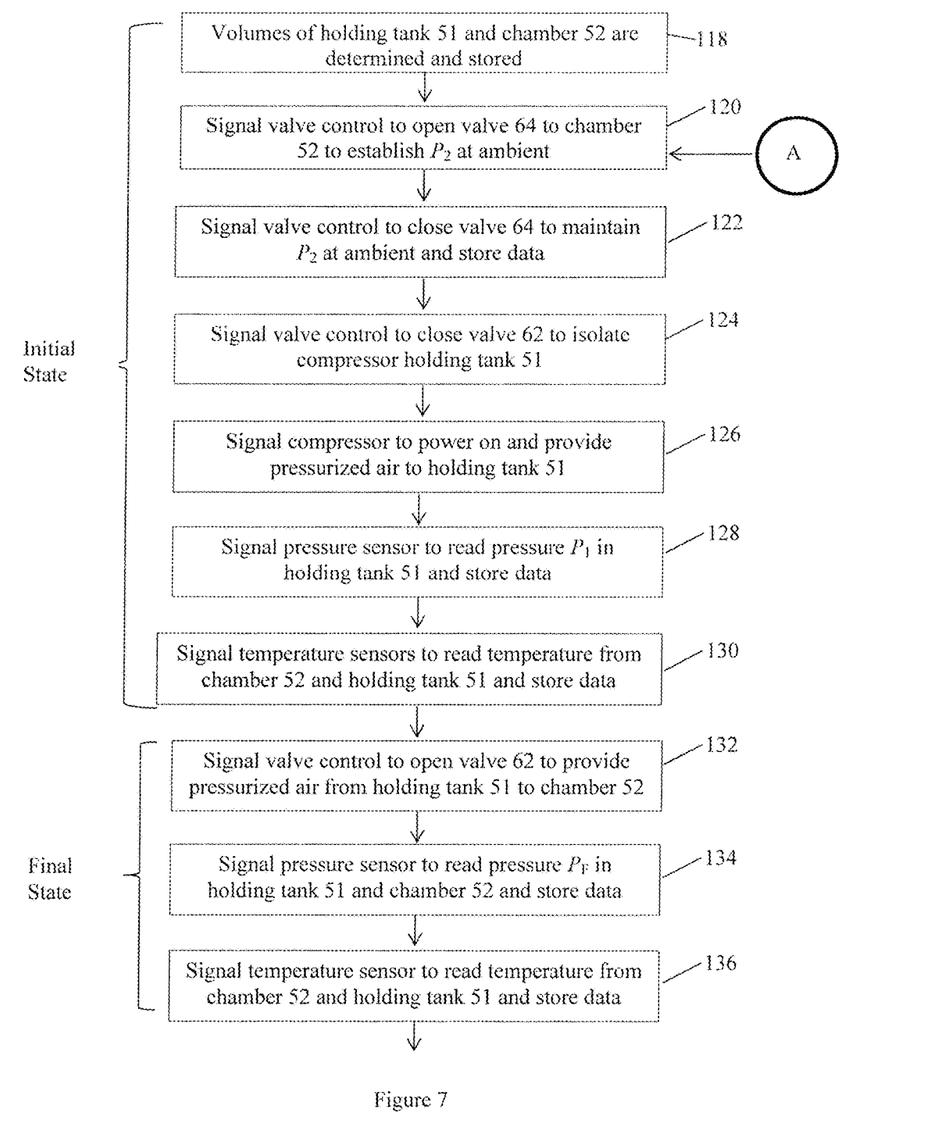
FIG. 7 illustrates steps associated with the computerized implementation of the gas-displacement volumetry system.

When the system and method of gas-displacement volumetry is automated and controlled by computer 100, at the beginning of the process, the volumes of holding tank 51 and chamber 52 are stored as shown at step 118 in FIG. 7. The volumes of holding tank 51 and chamber 52 can be determined and manually entered into computer 100 storage 104. Alternatively, the system and method of gas-displacement volumetry can be used as part of the calibration process described above to determine the volumes of the holding tank 51 and chamber 52. At step 120, computer 100 signals valve control 114 to open valve 64. Valve control 114 can be a motor attached to a valve and that can be operated to open and close the valve or another mechanism for opening and closing a valve as are well known to persons skilled in the art. Opening valve 64 exposes chamber 52 to ambient conditions such that pressure $P_2$ in chamber 52 is ambient air pressure. At step 122, computer 100 signals a valve control 114 to close valve 64 such that the pressure $P_2$ inside chamber 52 is maintained at ambient air pressure and stores that data. At step 124, computer 100 signals a valve control 114 to close valve 62. Closing valves 62 and 64 isolates holding tank 51 and chamber 52. At step 126, computer 100 signals compressor 50 to power on such that compressor 50 provides pressurized air to holding tank 51. Computer 100 then signals a pressure sensor 112 to read and store the pressure $P_1$ in holding tank 51 and store that data at step 128. At step 130, computer 100 also signals temperature sensors 110 to read and store the temperatures of holding tank 51 and chamber 52. Steps 120-130 represent the initial state as described in relation to FIGS. 2-5 above.

Steps 132-136 represent the final state as described in relation to FIGS. 2-5 above. At step 132, computer 100 signals a valve control 114 to open valve 62. Opening valve 62 connects holding tank 51 and chamber 52 such that pressurized gas flows from holding tank 51 to chamber 52, equalizing the pressure in holding tank 51 and chamber 52. Computer 100 then signals a pressure sensor 112 to read and store the pressure $P_F$ in holding tank 51 and chamber 52 and store that data at step 134. At step 136, computer 100 also signals temperature sensors 110 to read and store the temperatures of holding tank 51 and chamber 52.

Steps 138-144 represent the automated computation of the volume of object 30, $V_{object}$. At step 138, the temperature and pressure data is read from storage 104 of computer 100. If the temperature of the holding tank 51 and chamber 52 in the initial state equal their temperatures in the final state at step 140, then pressures $P_1$, $P_2$ and $P_F$ and volumes $V_1$ and $V_2$ are used in Equation 2 above to calculate $V_{object}$ at step 144. If, however, the temperatures of holding tank 51 and chamber 52 are not equal during the initial and final states at step 140, then pressure $P_1$, $P_2$ and $P_F$, volumes $V_1$ and $V_2$ and temperatures during the initial state $T_1$ and during the final state $T_2$ are used in the Ideal Gas Law equation to calculate $V_{object}$ at step 142. Finally, at step 146, the computer 100 determines whether the process should be repeated for the object. As described above, typically tests are repeated to ensure statistical accuracy. If so, the computer returns to the beginning of the process (step 120) at step 148. If not, the process comes to an end at step 150.

The calibration process can be automated using computer 100 as well. Automation of the calibration process involves implementing the calibration steps described above in a software program running on computer 100. That program would read sensors, control valves and provide air pressure in the same manner as described with respect to FIG. 7 in relation to using gas-displacement volumetry to determine the volume of an object. That is computer 100 can be used to store $V_{object}$, read and store data from temperature sensors 110 and pressure sensors 112, control the opening and closing of valves via valve controls 114, control the creation and introduction of pressurized gas via gas pressure control 116, and use equations 5a-5d and the values for $V_{object}$, $P_1$, $P_2$, $P_F$, $T_1$ and $T_2$ to calculate holding tank 51 and chamber 52 volumes.

While the above description of the computerized implementation of the gas-displacement volumetry system and method refers to storing various data (e.g. volume, pressure and temperature), it would be understood by a person skilled in the art that a computerized implementation of the system and method could operate without discrete storage steps. In other words, some or all of the data could be read and used "on the fly," in a run-time environment.

What is claimed is:

1. A system for gas-displacement volumetry', comprising:
a source of pressurized gas integrated with a holding tank;
a chamber;
a valve disposed between said source of pressurized gas integrated with said integral holding tank and said chamber;
said holding tank and chamber contain gas and have initial pressures when said valve is in a first position; and said holding tank and said chamber having a final pressure when said valve is in a second position.

2. The system of claim 1, wherein the holding tank and the chamber have specified volumes.

3. The system of claim 2, wherein the volume of an object placed in the chamber can be determined as a function of the volumes of the holding tank and chamber, the initial pressures of the holding tank and chamber and the final pressure of the holding tank and chamber.

4. The system of claim 3, wherein said volume of the object is determined using a formula derived from Boyle's Law.

5. The system of claim 2, wherein the said holding tank and chamber have an initial temperature when the valve is in the first position and a final temperature when the valve is in the second position.

6. The system of claim 5, wherein the volume of an object can be determined as a function of the volume of the holding tank and chamber, the initial pressures of the holding tank and chamber, the final pressure of the holding tank and chamber and the initial and final temperatures of the holding tank and chamber.

7. The system of claim 6, wherein said volume of the object is determined using a formula derived from the Ideal Gas Law.

8. The system of claim 1, wherein the source of pressurized gas having holding tank and chamber are isolated when the valve is in the first position.

9. The system of claim 1, wherein the source of pressurized gas having holding tank and chamber are connected when the valve is in the second position.

10. A method of gas-displacement volumetry for determining the volume of an object, comprising:
determining the volume of a holding tank integral with a source of pressurized gas and a chamber;
determining the initial pressures of gases contained in said holding tank and said chamber when a valve disposed between said holding tank integral with a source of pressured gas and said chamber is in a first position;
determining the final pressure of said holding tank and said chamber when said valve is in a second position; and
determining the volume of an object placed in the chamber as a function of the volumes of the holding tank and the chamber, the initial pressures of the holding tank and the chamber and the final pressure of the holding tank and the chamber.

11. A method of determining the volume of a chamber for use in a gas-displacement volumetry system, comprising:
providing a source of pressurized gas having an integral holding tank, an object and a chamber;
said holding tank having a volume and said object occupying a volume;
placing the object in said chamber;
determining the initial pressures of gases contained in said holding tank and said chamber when said valve disposed between said source of pressurized gas having said integral holding tank and said chamber is in a first position;
determining the final pressure of gases in said holding tank and chamber when said valve is in a second position; and
determining the volume of the chamber as a function of the volume of the holding tank and object, the initial pressures of the holding tank and the chamber and the final pressure of the holding tank and the chamber.

12. A computerized system for gas-displacement volumetry:
a computer receiving data concerning the volumes of a holding tank integral with a source of pressurized gas and a chamber;
said computer connected to a valve controller controlling a valve disposed between said holding tank integral with a source of pressurized gas and said chamber;
said computer further connected to at least one pressure sensor in each of said holding tank and in said chamber;
said computer accessing data from at least one pressure sensor to determine the initial pressures of gases in said holding tank and said chamber when said valve is in a first position;
said computer accessing data from at least one pressure sensor to determine the final pressure of said holding tank and said chamber when said valve is in a second position; and
said computer determining the volume of the object as a function of the volumes of the holding tank and chamber, the initial pressures of the holding tank and chamber and the final pressure of the holding tank and chamber.

13. A computerized method for gas-displacement volumetry, comprising:
Receiving data concerning the volumes of a holding tank integral with a source of pressurized gas and a chamber;

determining the initial pressures of gases contained in said holding tank integral with a source of pressurized gas and chamber when a valve disposed between said holding tank and said chamber is in a first position;

determining the final pressure of said holding tank and said chamber when said valve is in a second position; and determining the volume of an object placed in the chamber as a function of the volumes of the holding tank and the chamber, the initial pressures of the holding tank and the chamber and the final pressure of the holding tank and the chamber.

\* \* \* \* \*